United States Patent [19]
Mullins

[11] 4,218,206
[45] Aug. 19, 1980

[54] MOLD BOX APPARATUS

[76] Inventor: Wayne L. Mullins, 5001 E. Cactus, Scottsdale, Ariz. 85254

[21] Appl. No.: 947,590

[22] Filed: Oct. 2, 1978

[51] Int. Cl.[2] .................................... A21C 3/00
[52] U.S. Cl. .................................... 425/253; 425/359; 425/413; 425/414; 425/452
[58] Field of Search ............... 425/253, 413, 414, 452, 425/359, DIG. 117

[56] References Cited

U.S. PATENT DOCUMENTS

| | | | |
|---|---|---|---|
| 3,279,021 | 10/1966 | Pratt | 425/253 |
| 3,833,331 | 9/1974 | Springs | 425/253 |
| 3,920,369 | 11/1975 | Boehringer et al. | 425/253 |

*Primary Examiner*—Donald J. Arnold
*Assistant Examiner*—James R. Hall
*Attorney, Agent, or Firm*—Herbert E. Haynes, Jr.

[57] ABSTRACT

Interlocking cementitious building blocks of special configuration are fabricated in a mold box apparatus which includes a pallet die, a mold box die and a head die which are used in conjunction with a conventional block making machine. The mold box assembly is a self-aligning apparatus for precision casting of the interlocking elements of the building blocks.

9 Claims, 6 Drawing Figures

MOLD BOX APPARATUS

BACKGROUND OF THE INVENTION

1. Field of the Invention

This invention relates to an apparatus for fabrication of cementitious building blocks and more particularly to a self-aligning mold box apparatus for precision casting of interlocking mortarless cementitious building blocks.

2. Description of the Prior Art

The use of building blocks, of the type sometimes referred to as cement blocks, concrete blocks or cinder blocks rather than conventional clay bricks is becoming more widespread. Such building blocks are commonly used by the construction industry for erecting retaining walls, buildings, and the like, and for purposes of this description, all such blocks will hereinafter be referred to as cementitious blocks.

The commonly used cementitious blocks are erected in tiers or rows, which are most often offset, and the individual cementitious blocks are bonded together by mortar which is interposed between the meeting horizontal and vertical surfaces or faces of the blocks. The necessity of such mortar bonding impairs the accuracy and speed with which such blocks can be erected, and requires a relatively high degree of skill to erect a properly aligned and levelled plurality of such blocks.

The degree of skill needed to erect these mortar bonded prior art blocks, not to mention the laborious task, has all but relegated the laying of such blocks to skilled craftsmen.

The laborious task of erecting mortar bonded blocks and the high cost of employing properly skilled craftsmen has prompted the search for mortarless interlocking cementitious building blocks which would ease the problems associated with the prior art blocks.

While the known art includes examples of mortarless interlocking blocks, these known blocks have not proven to be successful for various reasons such as: excessive weight, loose fitting and/or improperly aligned interlocking elements, inadequate provisions for the passage of wiring and pipelines through an erected wall, interference fit between adjacent blocks, and the like.

Many of the problems associated with the prior art interlocking cementitious building blocks are due to the design of the blocks themselves, however, some of these problems arise from the apparatus employed for casting of such blocks.

With regard to the mortarless interlocking cementitious blocks, many of the problems associated therewith have been eliminated and others substantially reduced by a particular block which is fully disclosed in U.S. patent application Ser. No. 903,731 filed on May 8, 1978 by the same inventor.

Regarding fabrication apparatus for mortarless interlocking cementitious blocks, it will be appreciated that the dimensional tolerances of the mortar bonded blocks is not particularly critical in that dimensional inaccuracies and/or inconsistencies existing in such blocks can be compensated for by the craftsman applying more or less mortar during laying of the blocks. Such is not the case in mortarless interlocking blocks as these blocks must be cast, or molded, within specific tolerances in order to achieve proper alignment, leveling and the like.

Therefore, the fabrication, or casting apparatus employed in the manufacture of mortarless interlocking cementitious building blocks must be a precision mechanism which is designed to facilitate relatively frequent inspections for wear brought on by the well known abrasive characteristics of cement, and such apparatus should ideally be provided with easily replaceable parts at the critical wear points in the apparatus. Further, due to the relatively high cost of making such a precision fabricating apparatus, it should ideally be easily modifiable so that the main elements can be employed to form the various types of blocks needed to erect walls such as half-blocks, one-quarter blocks and three quarter-blocks.

In addition, it is a necessity that the various components of the fabrication apparatus be precisely positioned relative to each other during block casting operations to insure proper alignment and positioning of the interlocking elements of the cementitious blocks.

To the best of my knowledge, no prior art fabrication apparatus has been devised or suggested with all of the above described characteristics in general, and no prior art apparatus has been devised or suggested for fabrication of the particular mortarless interlocking cementitious blocks disclosed in the previously referenced U.S. patent application.

Therefore, a need exists for a self-aligning, precision mold box apparatus which overcomes some of the shortcomings of the prior art, and forms a particular type of mortarless interlocking cementitious block.

SUMMARY OF THE INVENTION

In accordance with the present invention, a new and useful self-aligning mold box assembly is provided for casting the particular mortarless interlocking cementitious building blocks disclosed in the previously referenced U.S. patent application. The mold box assembly includes a pallet die, a mold box die, and a head die assembly which are used in conjunction with well known conventional block making machines. The block making machine, among other things, sequentially moves the pallet die to a position below the mold box die, fills the mold box die with cement and reciprocally moves the head die assembly into the mold box die atop the cement.

The mold box die is provided with especially configured cores which form vertical passages through the cementitious block and those vertical passages each define four open corners on one surface of the block and four vertically aligned corner corbels on the other surface of the block. The cores of the mold box die are each provided with four depending projections each defining one-half of a frustro conical projection. The projections protrude into frustro conical cavities formed in the pallet die when the die is positioned below the mold box die which results in precision self-alignment of the pallet die with respect to the mold box die, and causes the cement to fill the open part of the cavities to provide projections of one-half frustro conical configurations on each of the corner corbels of the cement block.

The special configuration of the cores of the mold box die along with the self-aligning feature of the mold box assembly results in precision cast blocks which are interlockingly assembled in accurately aligned and level relationship by positioning a block so that the open corners of its passages receive the upstanding projections of the block or blocks immediately therebelow.

The mold box die is provided with reversible and/or replaceable wear plates to facilitate maintaining of the apparatus within specific tolerances, and those wear plates are interchangeable so that the apparatus may be easily configured to fabricate full, one-half, one-quarter and three-quarter blocks.

Accordingly, it is an object of the present invention to provide a new and useful apparatus for fabrication of mortarless interlocking cementitious building blocks.

Another object of the present invention is to provide a new and improved apparatus for fabrication of mortarless interlocking cementitious building blocks, with the apparatus being adapted for use on conventional block making machines.

Another object of the present invention is to provide a new and improved apparatus of the above noted character which is a precision mechanism for casting the cementitious building blocks within specific tolerances.

Another object of the present invention is to provide a new and useful apparatus of the above noted type which is designed with easily replaceable parts at the critical wear points to facilitate maintenance of the apparatus.

Another object of the present invention is to provide a new and improved apparatus of the above described character which is adapted to accept interchangeable parts in order that the apparatus may be configured to form full, half, one-quarter and three-quarter blocks.

Another object of the present invention is to provide an apparatus of the above noted type which is adapted to form special mortarless interconnecting cementitious blocks having particular arrays of special male projections which are in vertical alignment with open corners formed on opposite ends of especially configured passages through the blocks.

Still another object of the present invention is to provide a new and improved apparatus of the above described character which comprises in combination, a pallet die, a mold box die, and a head die assembly all of which are especially configured for fabrication of a special type of mortarless interconnecting cementitious building block.

Yet another object of the present invention is to provide a new and improved apparatus of the above described character in which the mold box die and the pallet die are self-aligning to insure precision positioning of the interlocking elements of the block.

The foregoing and other objects of the present invention, as well as the invention itself, may be more fully understood from the following description when read in conjunction with the accompanying drawings.

DESCRIPTION OF THE PREFERRED EMBODIMENT

Figure 1:
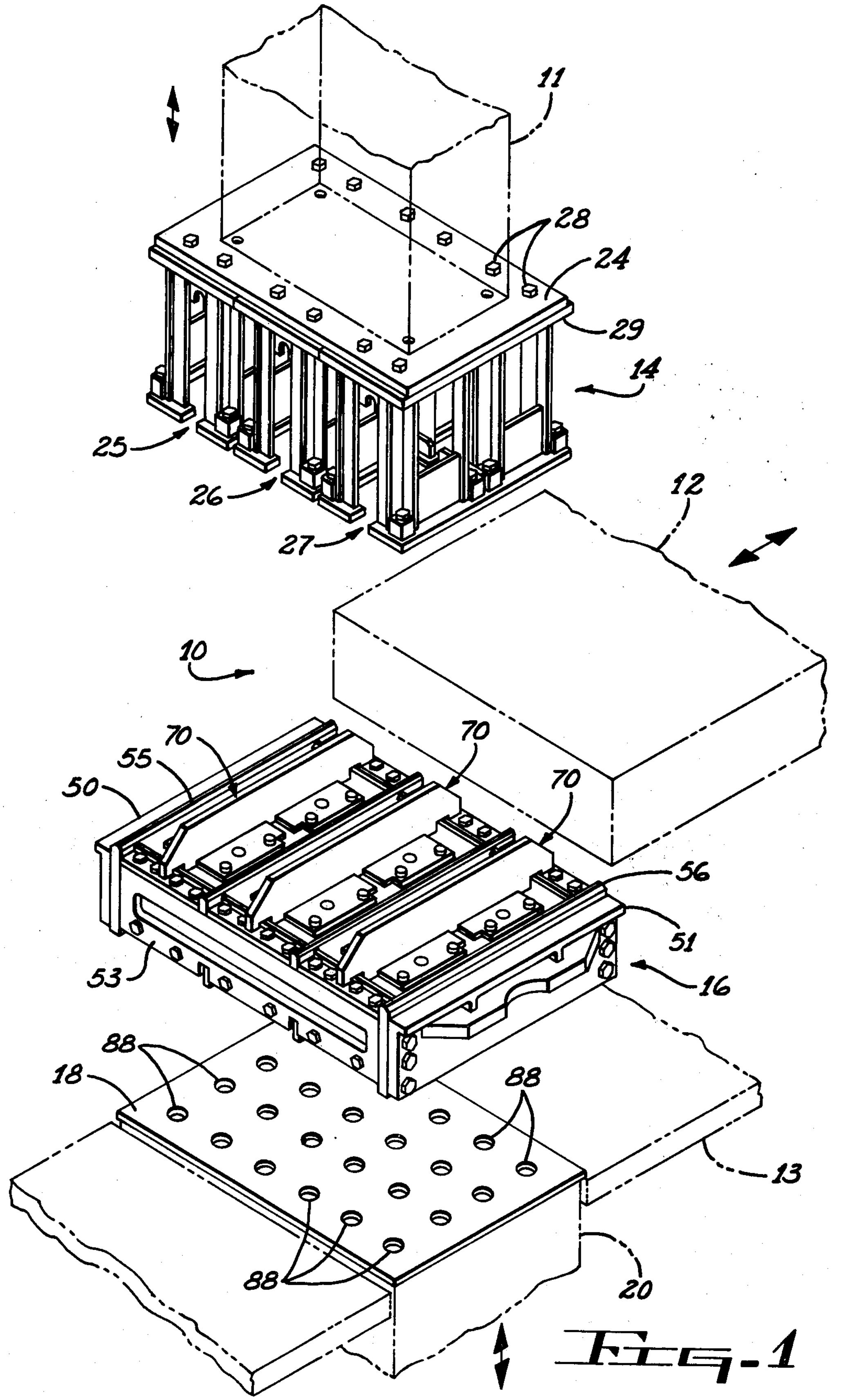
FIG. 1 is an isometric view illustrating the pallet die, mold box die, and head die assembly, which form the mold box apparatus of the present invention, with those elements shown in their relative positions with respect to each other and with respect to a phantom fragmentary illustration of a block making machine.

Referring more particularly to the drawings, FIG. 1 illustrates an apparatus for forming mortarless interlocking cementitious blocks with the apparatus being indicated in its entirety by the reference numeral 10. The apparatus 10 is mounted on and operated in conjunction with a conventional block making machine which is shown in fragmentary phantom lines to include a vertical reciprocating device 11, a horizontal reciprocating cement delivery mechanism 12 and a pallet moving conveyor 13. As will hereinafter be described in detail, the apparatus 10 includes the combination of a head die assembly 14 mounted on the vertical reciprocating device 11, a mold box die 16 suitably held in a fixed position such as upon the block making machine with such affixation not being shown, and a two function structure which serves as both a pallet and a die, and which is hereinafter referred to as a pallet die 18, with the pallet die 18 being carried on the conveyor 13, and a suitable pallet elevating device 20.

For completeness of this description, a brief and general discussion of the commonly employed block making process will now be given. The pallet conveyor brings the pallet into position beneath the mold box and a suitable elevating device raises the pallet to close the otherwise open bottom of the mold box. The cement delivery mechanism is then moved into position above the mold box and cement is deposited into the cavities of the mold box. The delivery mechanism is then retracted and the head assembly is moved downwardly into the mold box atop the cement therein. The lowered head assembly exerts a vibrating and compacting force on the cement to mold the cement into a configuration dictated jointly by the pallet, mold box, and head assembly. When the compacting is complete, the head assembly is raised and the pallet lowered, whereupon, the pallet having the molded or cast blocks thereon, is moved by the conveyor to a kiln (not shown) for curing. The cycle is then repeated with all of the various steps and operations being automatic.

It should be noted that the above brief description of the block making process is well known in the art, and that the basic process may be carried out by various well known block making machines.

The apparatus 10 is shown as being configured to simultaneously cast three full blocks per machine cycle, however, the apparatus may be configured to produce more or less blocks per cycle as desired, and in accordance with the capabilities of the block making machine to which the apparatus 10 is attached.

The apparatus 10 of the present invention is configured to form a particular type of mortarless interlocking cementitious block of a type which will be briefly described herein and as is fully disclosed in the hereinbefore referenced U.S. patent application.

Figure 2:
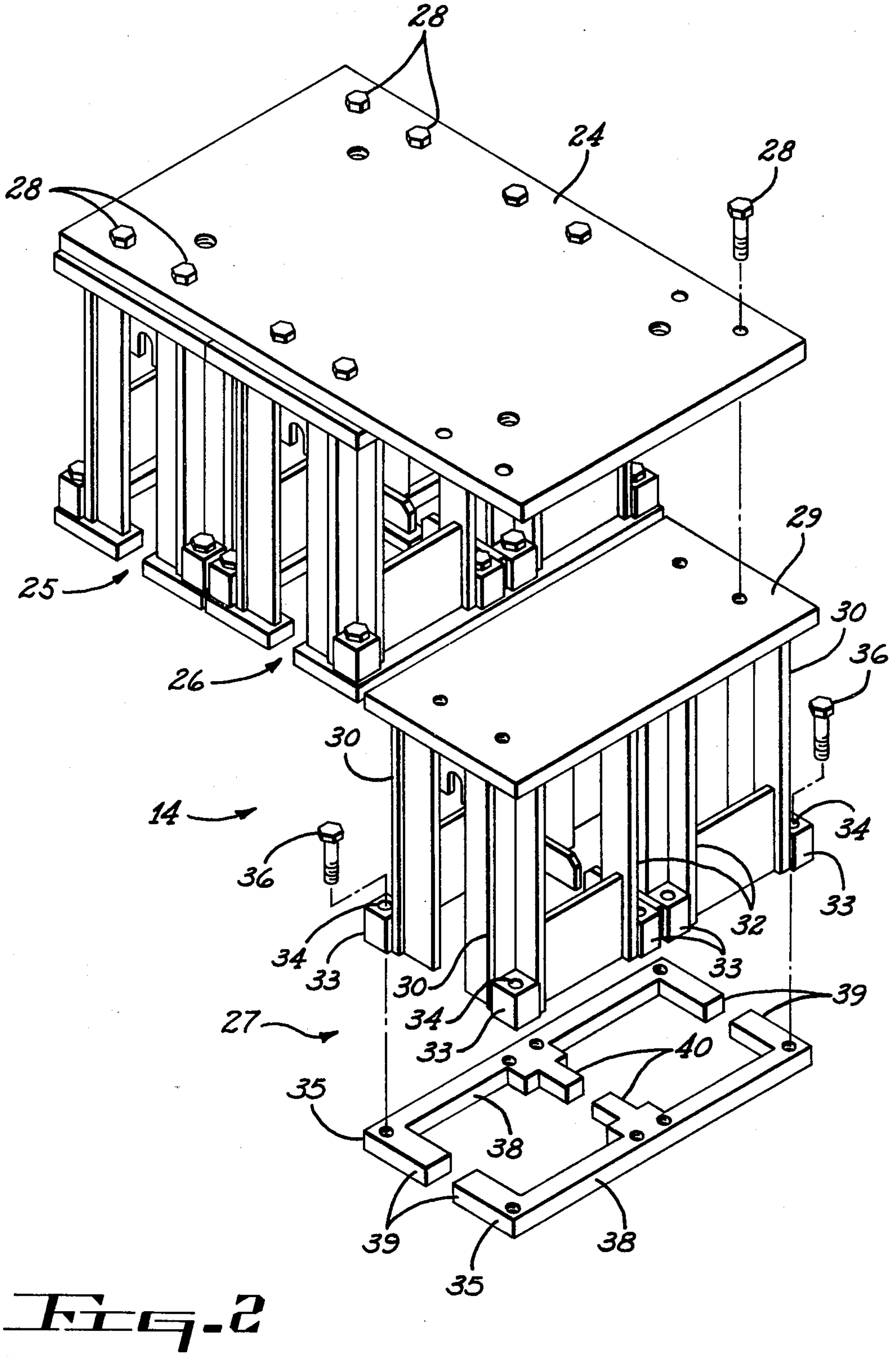
FIG. 2 is an isometric view of a multi-block forming head die assembly having one of the head dies exploded therefrom to show the elements and various features thereof.

As seen best in FIG. 2, the head die assembly 14 includes a flat plate 24 which is suitably attached to the vertical reciprocating device 11 of the block making machine (FIG. 1). The flat plate 24 has three identical head dies 25, 26 and 27 demountably attached thereto, such as with bolts 28, so that the head dies depend from the plate 24.

Since the head dies 25, 26 and 27 are identical, it will be understood that the following detailed description of the head die 27 also applies to the head dies 25 and 26.

As shown, the head die 27 includes a flat mounting plate 29 of rectangular configuration having four corner columns 30 (three shown), each depending from a different one of the corners of the plate, and having four intermediate columns 32 (two shown), with a different pair of the intermediate columns 32 depending from the mid-point of each of the longitudinal sides of the mounting plate 29. The corner columns 30 and intermediate columns 32 are affixed at their respective locations on the mounting plate 29, each are suitably braced, and each have a mounting block 33, with a bore 34 formed therethrough, affixed to its opposite end. Therefore, it will be apparent that the head die 27 is provided with four mounting blocks 33 aligningly disposed along and spaced below each of the longitudinal edges of the mounting plate 29.

A pair of mirror image shoe dies 35 are demountably attached to the mounting blocks 33 of the head die 27 such as with bolts 36 so that one of the shoe dies 35 is affixed to four longitudinally aligned blocks 33, and the other shoe die 35 is affixed to the remaining and oppositely disposed longitudinally aligned mounting blocks 33.

Each of the shoe dies 35 is configured to resemble the letter "E" when viewed from above or below, and thus is formed with a longitudinal portion 38 having integral and normally extending end portions 39 and intermediate portion 40. The shoe dies 35 are those portions of the head die assembly which are in physical contact with the cement during block casting operations and thus transfer the vibrating and compacting forces necessary for casting of the block, and produce one of the horizontal flat surfaces of the blocks.

Figure 3:
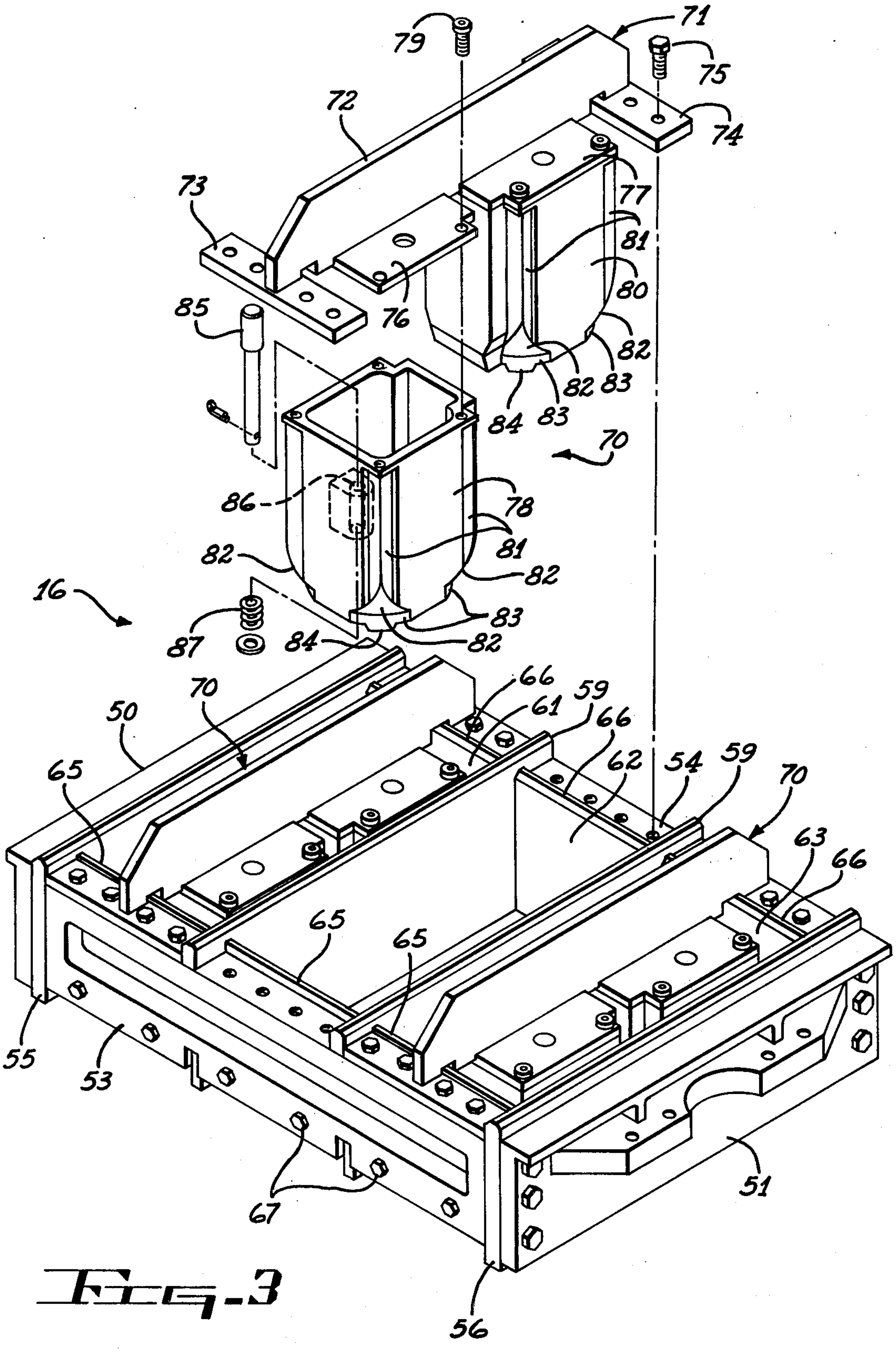
FIG. 3 is an isometric view of a multi-block forming mold box die with the block molding components exploded from one compartment thereof.
Figure 4:
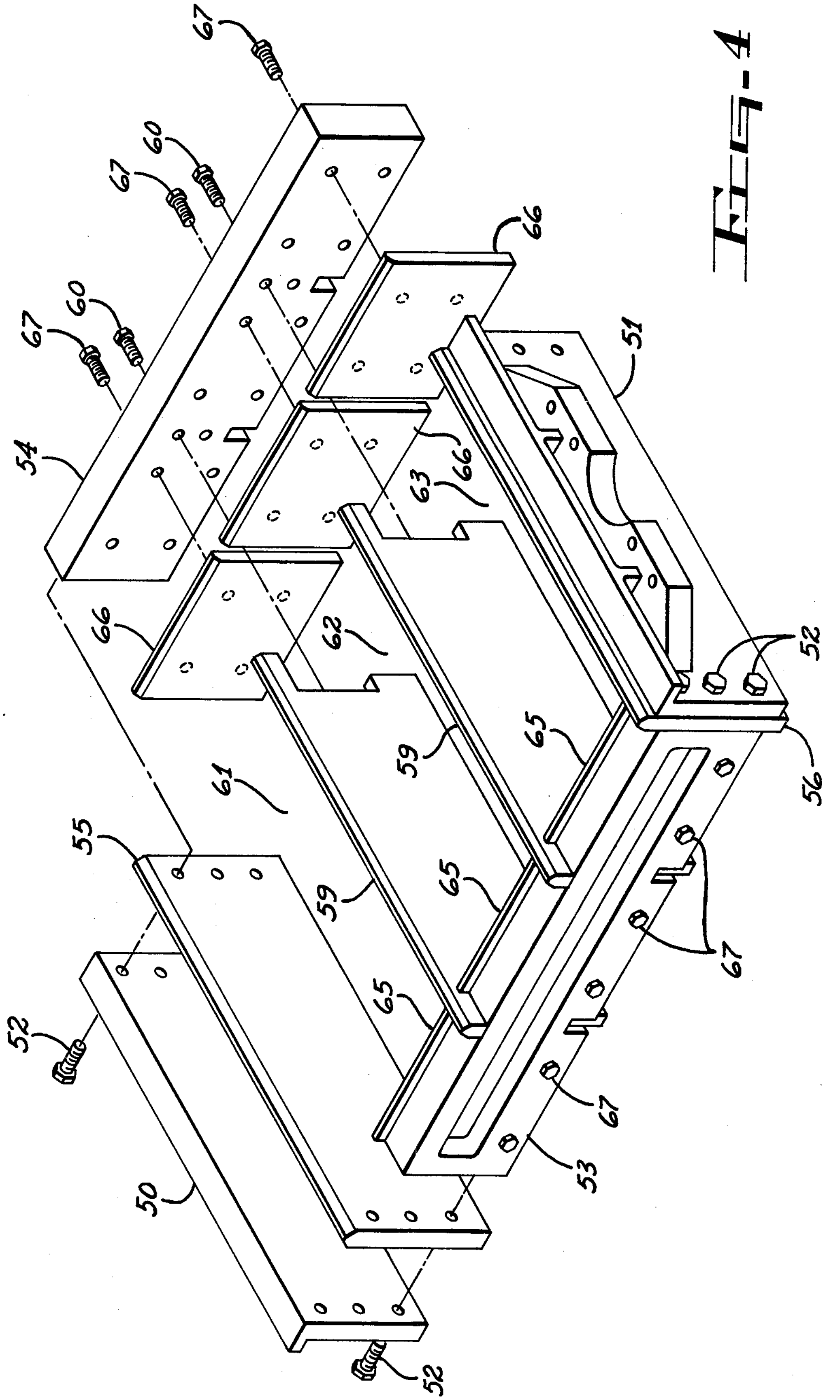
FIG. 4 is an isometric view of a multi-block forming mold box die structure with some of the elements of that mold box die structure being exploded to illustrate the various features thereof.

Reference is now made to FIGS. 1, 3 and 4 wherein the mold box die 16 is best seen. The mold box die 16 is shown as a three compartment structure for simultaneously casting three precision cementitious blocks as hereinbefore described. It will be understood however, that the mold box die may be configured with more or less compartments as desired.

FIG. 4 shows the mold box die 16 as having opposite side walls 50 and 51 demountably coupled with suitable bolts 52 to end walls 53 and 54 so as to provide a frame like structure having open bottom and top and in a rectangular geometric configuration. A precision side wear plate 55 is interposed between the side wall 50 and the end walls 53 and 54, and an identical side wear plate 56 is interposed between the side wall 51 and end walls 53 and 54. The same bolts 52 which couple the side walls 50 and 51 to the end walls 53 and 54 also couple the side wear plates 55 and 56 in their respective interposed positions. Thus, both the side walls 50 and 51 and the side wear plates 55 and 56 are demountable. It will be further noted that the side wear plates 55 and 56 will not be exposed to the abrasivness of cement at their extreme opposite ends, thus, when excessive wear occurs on the exposed surfaces, the side wear plates 55 and 56 may be simply reversed, thus, doubling their life.

A spaced pair of precision partition wear plates 59 are demountably secured transversely between the end walls 53 and 54 such as with bolts 60, and are spaced from the side wear plates 55 and 56 and spaced from each other so as to divide the mold box die into three equally sized compartments 61, 62 and 63. The demountable partition wear plates 59 may be easily replaced when excessive wear occurs on the opposite planar surfaces thereof by simply removing the bolts 60, instaling new wear plates and reinserting the bolts.

Each of the equally sized compartments 61, 62 and 63 of the mold box die assembly 16 are provided with opposite precision end wear plates 65 and 66 which are demountably attached to end walls 53 and 54, respectively, such as by bolts 67. Thus, the end wear plates 65 and 66 may be easily replaced when excessive wear occurs on the exposed surfaces thereof.

The mold box die 16 as described above, will determine the side and end surface configurations of the blocks cast therein, and core die assemblies 70 which are demountably attached to the mold box die 16, will determine the configuration of the passages formed through those blocks. Each of the core assemblies 70 are identical, thus, the following description of the particular assembly 70 which is shown as being exploded from the compartment 62 of this mold box die in FIG. 3, will be understood to also apply to the other core assemblies.

The core die assembly 70 includes a hanger bracket 71 which consists of a spanner member 72 having a mounting flange 73 on one end and a similar mounting flange 74 on the opposite end thereof. Those mounting flanges 73 and 74 are adapted for demountable affixation on the opposite end walls 53 and 54, such as with bolts 75, thus positioning the spanner member 72 centrally over the compartment 62. The spanner member has a spaced pair of core mounting pads 76 and 77 affixed thereto, such as by welding, with the pad 76 having a core die 78 demountably attached thereto by screws 79, and the pad 77 similarly having a core die 80 demountably secured thereto. The mounting pads 76 and 77 with their respective core dies 78 and 80 dependingly mounted thereon will determine the internal configuration of the passages of the block cast in the compartment 62 as hereinbefore mentioned. As seen, the pads 76 and 77 are substantially square, and the cores 78 and 80 are similarly shaped with especially configured corners and depending ends as will hereinafter be described. Each corner of the cores 78 and 80 are formed with "L" shaped in cross section notches 81 which wrap around the corners and extend approximately three-quarters of the length of their respective cores 78 and 80, with the notches opening at their lower ends into inwardly flared enlarged cavities 82 each having an arcuate surface 83 at the extreme lower end thereof.

Therefore, with the cores 78 and 80 thus configured, the blocks, which are fully shown and described in the hereinbefore referenced U.S. patent application, are cast in the compartments 61, 62 and 63 of the mold box die 16 so as to have a pair of vertically disposed passages formed therethrough with each passage having a relatively small "L" shaped in cross section columnar configuration cast in each corner thereof, which is formed by cement filling the notches 81, and will have corner corbels caused by cement filling the enlarged cavities 82. The cores 78 and 80 are each formed with four projections 84 (one shown in FIG. 3) which depend from the bottom surface of the cores, with each projection being located at a different corner of its respective one of the cores. As seen best in FIGS. 5 and 6, the projections 84 are in the shape of approximately one-half of an inverted frustro conical configuration, i.e., a frustro conical projection which is vertically bisected. Thus, each of the projections 84 is formed with a vertical surface 90, which is flush with the arcuate surface 83 of its respective one of the enlarged cavities 82 formed in the depending end of the cores, and is formed with a curved sloping surface 91. The projections 84 are thus configured and located so as to provide the self-aligning feature of the mold box assembly 10 and for casting of the male interlocking elements of the blocks cast therein as will be hereinafter described in detail.

The core die 78 is provided with an oppositely positioned pair of plunger rods 85 (one shown) mounted therein with the rods 85 slidably carried in vertical bores 86 (one shown) within the core. The rods 85 are provided with suitable springs 87 (one shown) so that they are biased toward the open bottom of the mold box die 16. In this manner the rods 85 will exert a force on the combination pallet die 18 during a casting operation, and will assist in moving the pallet away from the mold box die when the casting operation is completed. Although, not shown, the core die 80 will be understood to also be provided with identical biasing assemblies.

As seen in FIG. 1, the pallet die 18 is a planar structure which is provided with a particular array of dimples or recesses 88 formed therein with those recesses each being configured in an inverted frustro conical shape. The pallet die is of substantially rectangular shape and is specifically sized as to its length and width dimensions so as to substantially match the bottom of the mold box die 16. The pallet die 18 is seen to have six rows of four recesses each, with the spacing between the rows being identical with the spacing between each of the recesses, and the rows being transversely aligned thereon which will position a different pair of those rows below each of the open compartments 61, 62 and 63 of the mold box die 16 when the pallet die is in position for a block casting operation.

It will now be seen that the blocks cast in the apparatus 10 will have the configuration of the vertical exterior side walls determined by the mold box die, the configuration of the vertical passages through the block determined by the core die assemblies 70, one horizontal surface determined by the pallet die 18 and the core die assemblies 70 with the other horizontal surface determined by the head die assembly 14 and the core die assemblies 70.

Figure 5:
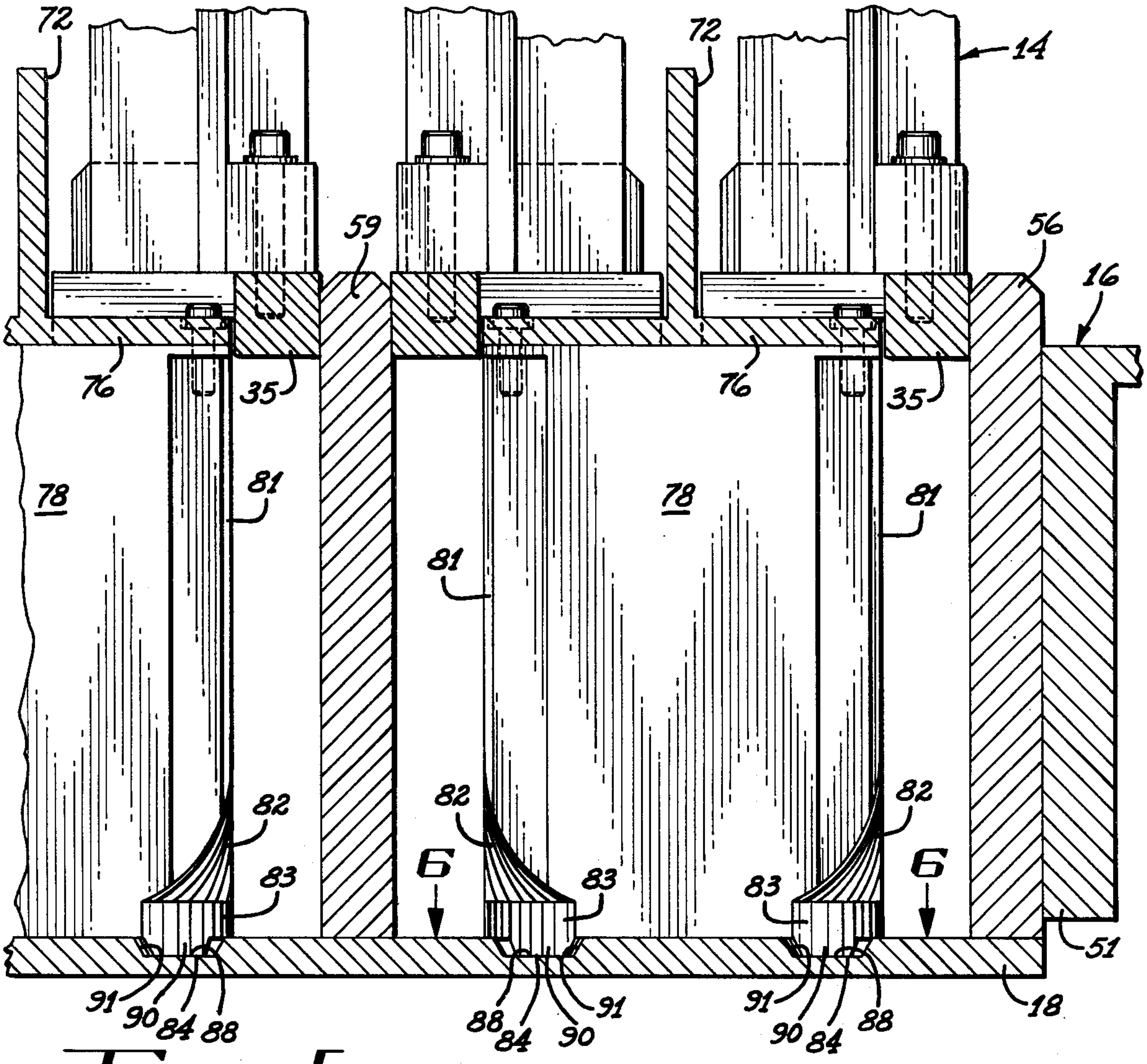
FIG. 5 is a fragmentary vertical sectional view taken through the pallet die, mold box die, and head die assembly in their working positions during casting of a mortarless interlocking cementitious block.
Figure 6:
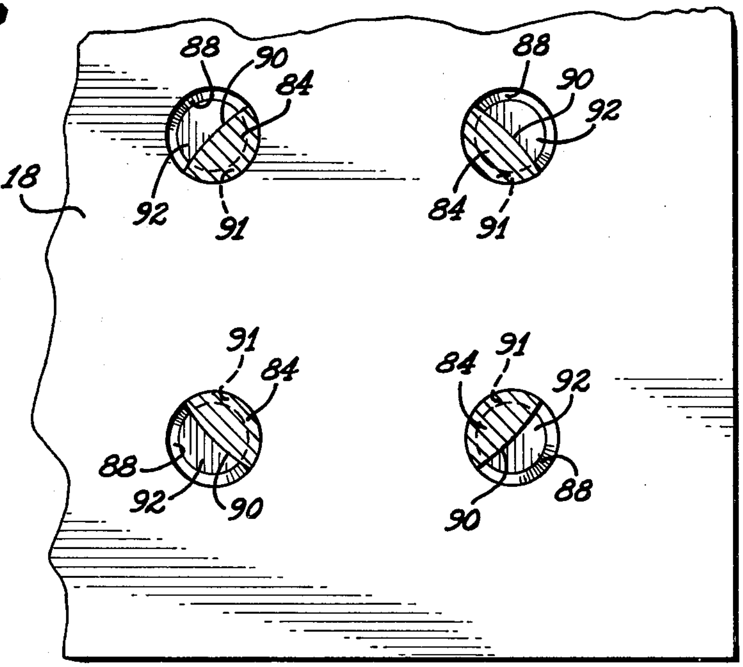
FIG. 6 is a fragmentary sectional view taken along the line 6—6 of FIG. 5.

For a clear understanding of the operation of the mold box apparatus 10 and the resulting configuration of the blocks cast therein, reference is now made to FIGS. 5 and 6. FIG. 5 shows a fragmentary vertical section of the apparatus 10 in its block casting position. The pallet die 18 is shown as having been raised by the elevating device 20 (FIG. 1) into engagement with the bottom edges of the mold box die 16 so that the otherwise open bottom thereof is now closed. Such elevating of the pallet die 18 will result in the projections 84 of the core dies 78 and 80 being received in the recesses 88 of the pallet die which, in the event of misalignment, results in shifting or otherwise moving the pallet die into the properly aligned position. In addition to this self-aligning feature, the projections 84 will partially close their respective ones of the recesses 88 as will be hereinafter described.

Although the cement (not shown) has been omitted from the drawings for clarity, it will be understood that when it is poured into the mold box die 16, by the cement delivery mechanism 12 (FIG. 1), it will flow into all of the open spaces and cavities formed by the mold box die 16 and the pallet die 18. Thus, the cement (not shown) in the open compartment 63 shown in FIG. 5, will be contained within the side wear plate 56, the partition wear plate 59, and the oppositely disposed end wear plates 65 and 66 (FIG. 4) and will completely surround the core 78 (and the core 80 shown in FIG. 3). The cement will flow into the notches 81 and the enlarged cavities 82 of the cores and will flow into the open portions 92 of the recesses 88 as seen in FIG. 6.

To complete the block casting operation, the head die assembly 14 is moved downwardly, subsequent to placement of cement in the mold box die 16, by the vertical reciprocating device 11 (FIG. 1) to the position shown in FIG. 5. In this downwardly moved or working position, the shoe dies 35 of the head die assembly 14 will lie atop the cement (not shown) and will transmit compacting and vibrating forces applied thereto by the block making machine in the well known manner. When the vibrating and compacting operations are completed, the head die assembly 14 is raised and the pallet die 18 is lowered, and such lowering of the pallet die 18 will move the cast blocks (not shown) out of the mold box die 16 and they will be carried by the pallet die 18 to a suitable kiln (not shown). The above described cycle is continuous and each new cycle is started when the conveyor 13 brings another pallet die into position below the mold box die 16.

Due to the above described configuration of the mold box assembly 10, each of the blocks (not shown) which are cast therein will be seen to have eight semi-frustro conical male projections which extend from one horizontal surface of the block and are supported on the corner corbels (not shown) which are cast in each corner of the passages formed through the block. Further, the opposite horizontal surface of the block (not shown) is configured, by virtue of the core dies 78 and 80, to provide eight open corners in the passages formed through the block and due to the notches 81 of the cores, those open corners are in precise vertical alignment with the male projections 84 cast on the opposite surface of the block.

Although not shown, it will be appreciated that the above described mold box die 16 may be easily modified to include suitably positioned dividers (not shown) within the open compartments 61, 62 and 63, so that it can be employed to simultaneously cast a pair of half-blocks (not shown) in each of the open compartments, or can be adapted to simultaneously cast a one-quarter block (not shown) and a three-quarter block (not shown) in each open compartment.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A self-aligning mold box apparatus for casting mortarless interlocking cementitious blocks of the type having vertical side and end walls, upper and lower horizontal surfaces and a pair of spaced passages extending vertically therethrough which form substantially square openings with open corners in the upper horizontal surface and form substantially square openings in the lower horizontal surface with a corner corbel in each corner of the openings formed in the lower horizontal surface and a projection depending from each of the corner corbels, said self-aligning mold box apparatus comprising:

(a) a mold box die which is open at the top and bottom and has at least one compartment therein which forms the vertical side and end walls of the cementitious block when cement is deposited therein;

(b) a core die assembly mounted on said mold box die so as to span the open top thereof, said core die assembly having a spaced pair of core dies depending therefrom into the compartment of said mold box die to form the pair of vertical passages through the cementitious block when cement is deposited therein;

(c) each of the core dies of said core die assembly being of substantially square cross section with four corners at the upper end thereof and having an inwardly flared cavity at each lower corner so that upon deposition of cement into said mold box die the upper horizontal surface of the cementitious block will have the pair of substantially square openings to provide a predetermined array of the open corners and the lower horizontal surface will have the pair of substantially square openings with the corner corbel formed in each corner thereof with the corner corbels arranged in an identical vertically aligned array with respect to the open corners;

(d) a plurality of projections depending from each of the core dies of said core die assembly with each of said projections located adjacent a different one of the flared cavities formed therein;

(e) a pallet die positioned in engagement with said mold box die to close the bottom thereof, said pallet die having a plurality of recesses formed therein with each disposed to receive a different one of said projections therein for self-aligning precision positioning of said pallet die relative to said mold box die; and (f) said projections each configured to close approximately one-half of the recess of said pallet die in which it is received so that upon deposition of cement into said mold box die the cementitious block will be formed with the projection depending from each of the corner corbels formed in the bottom horizontal surface thereof.

2. A mold box apparatus as claimed in claim 1 wherein each of the recesses formed in said pallet die is of inverted frustro conical configuration.

3. A mold box apparatus as claimed in claim 1 wherein each of said projections which depend from the core dies of said core die assembly is in the form of one-half of an inverted vertically bisected frustro conical solid.

4. A mold box apparatus as claimed in claim 1 wherein each of said projections which depend from the core dies of said core die assembly is in the form of one-half of an inverted frustro conical solid which is vertically bisected to provide a vertical surface which is flush with the inner surface of the inwardly flared cavity to which it is adjacent.

5. A mold box aparatus as claimed in claim 1 wherein the core dies of said core die assembly are formed with an L-shaped notch extending along the length of their corner edges to provide precise vertical alignment between the open corners and the projections depending from the cementitious block when cast in said mold box die.

6. A mold box apparatus as claimed in claim 1 wherein said mold box die comprises:

(a) a pair of end walls positioned in opposed spaced relationship with the opposite ends thereof forming aligned pairs of ends;

(b) a pair of side wall wear plates positioned normally with respect to said pair of end walls and each positioned in engagement with a different aligned pair of ends of said end walls;

(c) a pair of side walls each in coextending contiguous engagement with the outwardly facing surface of a different one of said pair of side wall wear plates;

(d) fastening means for demountably attaching said pair of side walls and said pair of side wall wear plates to the aligned pairs of ends of said end walls; and (e) a pair of end wall wear plates each demountably attached in contiguous engagement with the inwardly facing surface of a different one of said pair of end walls.

7. A mold box apparatus as claimed in claim 1 wherein said mold box die comprises:

(a) a pair of end walls positioned in opposed spaced relationship with the opposite ends thereof forming aligned pairs of ends;

(b) a pair of side wall wear plates positioned normally with respect to said pair of end walls and each positioned in engagement with a different aligned pair of ends of said end walls;

(c) a pair of side walls each in coextending contiguous engagement with the outwardly facing surface of a different one of said pair of side wall wear plates;

(d) fastening means for demountably attaching said pair of side walls and said pair of side wall wear plates to the aligned pairs of ends of said end walls;

(e) a pair of partition wear plates extending between said pair of end walls and demountably attached thereto, said partition wear plates disposed in spaced relationships to provide three equally sized compartments within said mold box die; and (f) three end wall wear plates demountably attached in contiguous engagement with the inwardly facing surface of each of said pair of end walls so that each compartment of said mold box die is provided with an opposed pair of said end wall wear plates.

8. A mold box apparatus as claimed in claim 1 wherein said pallet die is configured and positioned to provide eight recesses in the portion thereof which closes the bottom of the compartment of said mold box die, those eight recesses being arranged in two spaced rows of four spaced recesses each with the spacing between the rows being identical with the spacing between the individual recesses.

9. A mold box apparatus as claimed in claim 1 wherein said head die assembly comprises:

(a) a flat plate for attachment to a vertical reciprocating mechanism;

(b) a mounting plate attached to the lower surface of said flat plate;

(c) a plurality of columns depending from said mounting plate; and (d) a pair of mirror image shoe dies demountably attached to the depending ends of said columns in side by side relationship, said shoe dies for forming the top horizontal surface of the cementitious block when cement is deposited in said mold box die.

* * * * *